Jan. 7, 1964    R. L. LAUNDER ETAL    3,116,797
CONTROLLED ANGLE RIPPER ATTACHMENT
Filed June 28, 1962    3 Sheets-Sheet 1
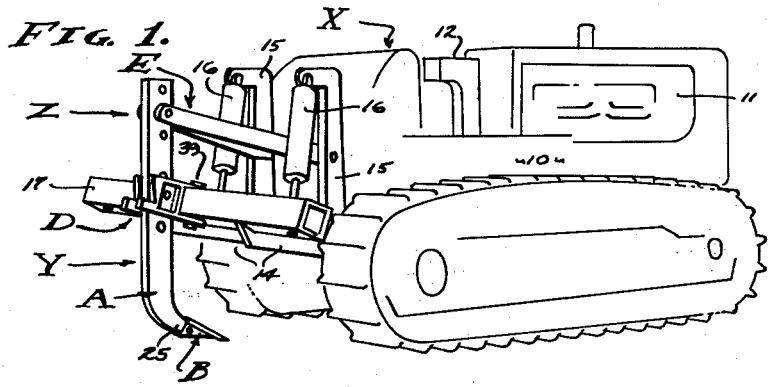
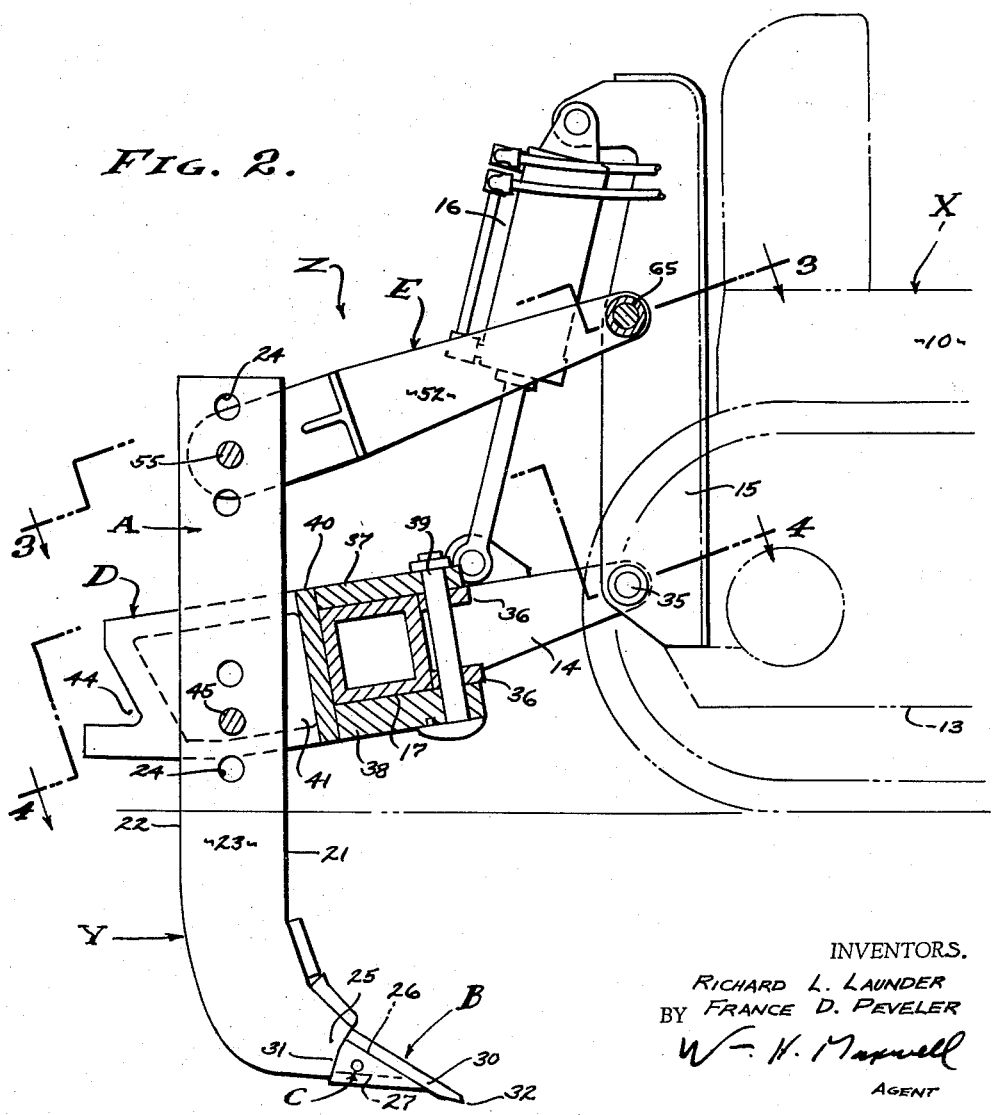
INVENTORS.
RICHARD L. LAUNDER
BY FRANCE D. PEVELER
AGENT

INVENTORS.
RICHARD L. LAUNDER
FRANCE D. PEVELER
BY
AGENT

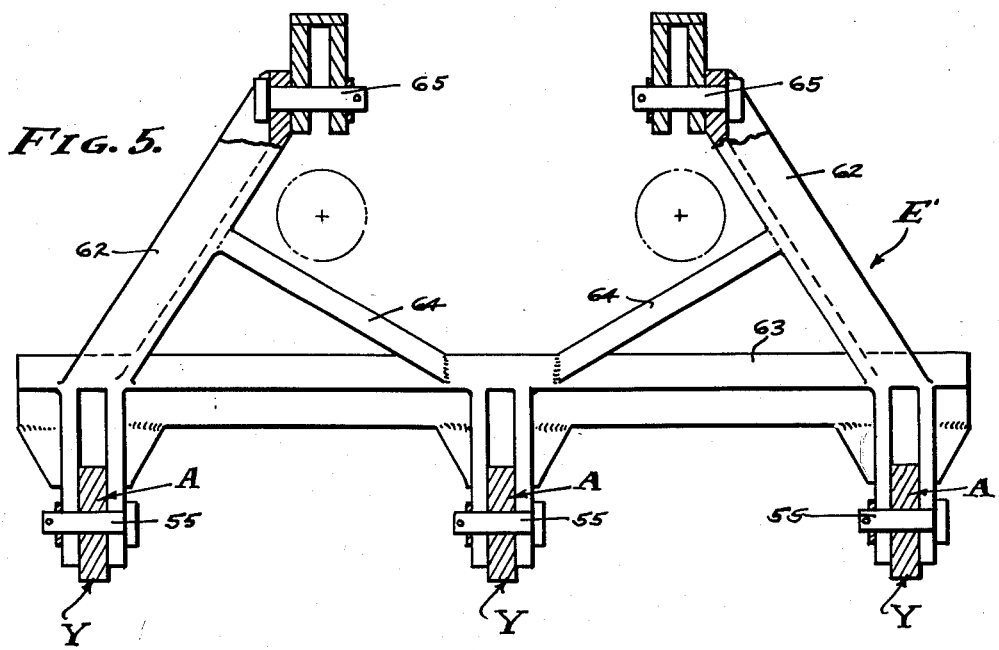
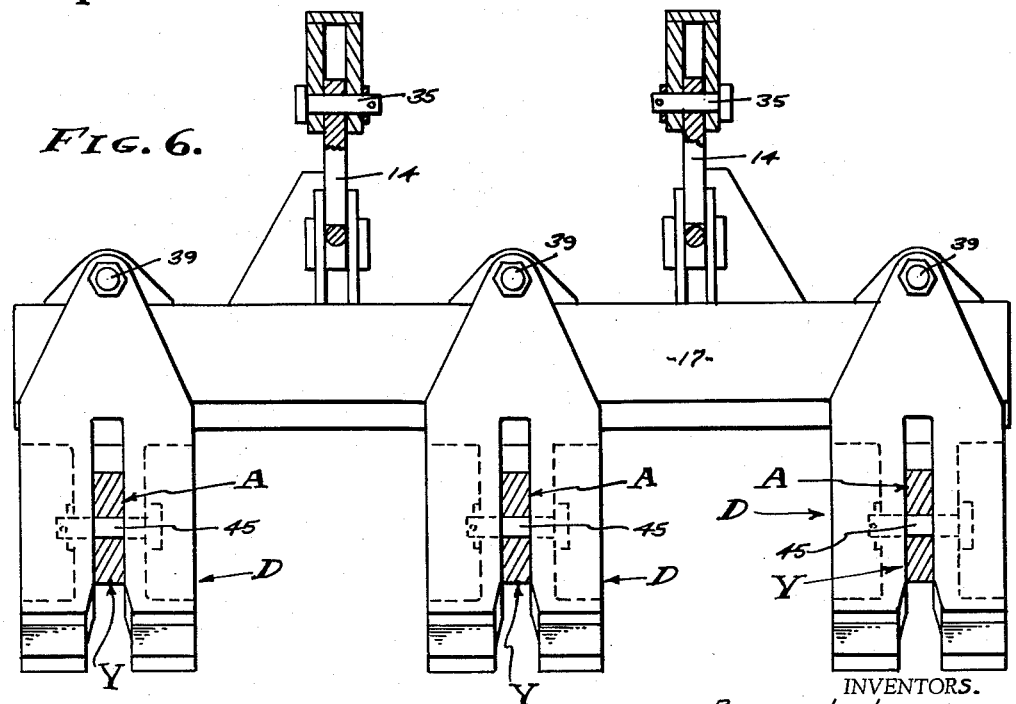

United States Patent Office 3,116,797
Patented Jan. 7, 1964

3,116,797
CONTROLLED ANGLE RIPPER ATTACHMENT
Richard L. Launder and France D. Peveler, Downey, Calif., assignors to H & L Tooth Company, Montebello, Calif., a corporation of California
Filed June 28, 1962, Ser. No. 205,893
4 Claims. (Cl. 172—484)

This invention relates to a tractor mounted "ripper," it being a general object of this invention to provide an attachment for the tool-bar of a tractor, by which a ripper shank is attached for operation at a controlled or constant angle.

Tractors, for the most part track-laying tractors, are used in the treatment and processing of earth and surfaces thereof. Varied implements are moved by these tractors in order to break through and into earth formation and to move the same. This invention is specifically concerned with a tractor and "ripper" that is pulled by the tractor to penetrate and to upset and move earth formation, that is, to go beneath the surface upon which the tractor is operating and to break through the formation to a certain depth as the tractor moves forward. As a result, a furrow is ripped thereby and along the earth's surface. It is to be understood that one or more of said implements can be employed along the tool bar as circumstances require to rip out obstacles and to tear out surface paving, etc.

Tractor mounted rippers are presently in wide use, comprising a tooth carried by a shank that is supported on a shiftable tool bar by means of a clevis. The tool bar is usually hydraulically powered to have a raised retracted position and an infinite number of lowered operating positions. The mechanism for raising and lowering the tool-bar is characterized by its lever configuration, whereby the tool bar swings upwardly and downwardly about a single pivotal axis or point. Obviously, the inclined angle of the tooth ordinarily varies widely, depending upon the height of the tool-bar. That is, when the tool-bar is raised above a normal operating position the tooth inclination is increased, and when the toolbar is lowered below the normal position the tooth inclination is decreased. Furthermore, even small changes in elevation change the tooth inclination greatly and as a result, it is usually difficult to gain predetermined penetrating action, and once said penetration is gained the tooth cannot be maintained and lowered at a constant angle. In any case, circumstances arise when it is highly advantageous to control and/or maintain the inclination of the ripper tooth, and for this reason ripper shanks and tooth points are designed to operate at predetermined and most desirable angles of inclination. However, said angular settings have not been readily controllable with the swinging lever supported tool-bar.

With the foregoing problem in mind, tractors have been designed from their inception to meet the requirements of controlled and/or constant angle in the ripper shank and tooth point. However, the prior art resorts to the use of an entirely new and separate piece of equipment in order to satisfy this want, or to accomplish the end result. Inasmuch as a large tractor represents a sizable investment, the prudent operator does not wish to maintain two tractors when one will suffice. Therefore, it is an object of this invention to utilize the older, more reliable, and least expensive tractor mounted ripper, or tractor mounted tool-bar, and to provide an attachment therefor, and to the end that said one tractor can also do the work of the newer and more advanced and more costly tractors. Specifically, this invention deals with a tractor having a single swinging lever support for a tool-bar, or the like. It is apparent that said tool-bar has many uses, to carry and manipulate a multitude of implements.

This invention avoids resort to a separate tractor mounted ripper when controlled and/or constant angle of inclination is required.

It is an object of this invention to provide a ripper that is operable vertically at a predetermined angle of inclination, regardless of height.

It is another object of this invention to provide an attachment that complements the existing lever supported tool-bar to mount a ripper shank that is infinitely adjustable without altering the angle of inclination of the same.

Further, it is an object of this invention to utilize the ripper shank as a lever of the mechanism provided to control or maintain the angle of disposition of the said shank. In this instance, the shank is pivoted to the tool-bar and is secured to the said above mentioned attachment, all by means of pivot pins, or the like. The shank is pivoted to a clevis mounted on the tool-bar and is selectively positioned, incrementally. Likewise, the shank is pivoted to the said attachment at selective increments.

It is still another object of this invention to provide a ripper attachment of the character referred to that is easily installed in a minimum of time and without resort to alteration of the original tractor that is involved, and wherein no compromises are made that would adversely affect the operation and effective use of a heavy duty ripper of the type under consideration.

The various objects and features of this invention will be fully understood from the following detailed description of the typical preferred forms and applications thereof, throughout which description reference is made to the accompanying drawings, in which:

FIG. 1 is a perspective view of a tractor carrying a single ripper and attachment therefor.

FIG. 2 is an enlarged detailed side view of the attachment and the ripper as combined with the existing swinging tool-bar.

Figure 3:
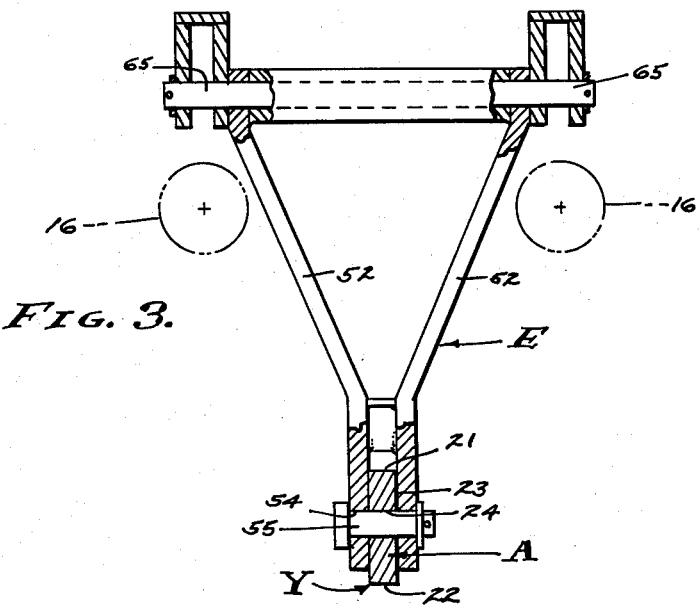
Figure 4:
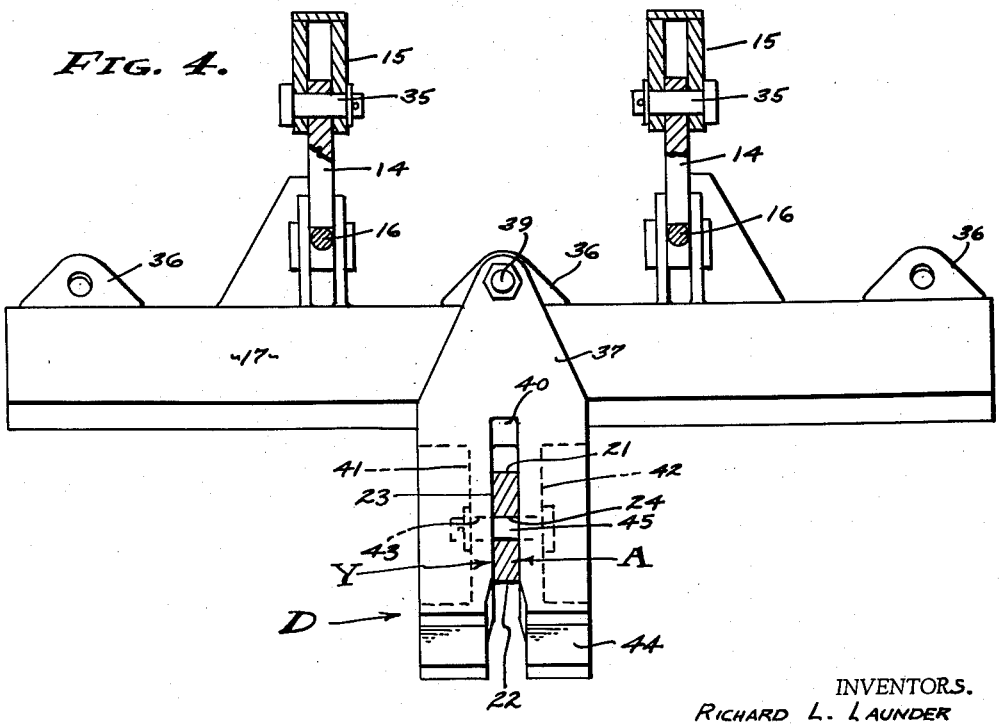

FIGS. 3 and 4 are plan views of the attachment and tool-bar respectively, and taken as indicated by lines 3—3 and 4—4 on FIG. 2.

FIGS. 5 and 6 are similar to FIGS. 3 and 4 and showing a second form of the invention.

Tractors and rippers therefor, and all machinery of the type under consideration, are heavy and rugged, and any attachment or addition thereto must be equally heavy and rugged in order to be dependable. The particular tractor mounted ripper to which the present invention and attachment is applicable is in wide successfull use and is characterized by a ruggedly mounted tool-bar or beam 17 that swings on the ends of a lever 14 pivoted on a transverse axis at the rear of the tractor X. It is usual practice to provide a pair of rigid columns 15 at the rear of the tractor, each mounting a hydraulic cylinder and piston unit for raising and lowering the tool-bar or beam. It is this general structure with which the attachment Z hereinafter disclosed is combined. Therefore, to this end the present invention is in the combination of said particular tractor X and the attachment Z, it being understood that other and like equipment can be angularly controlled according to this invention.

The present invention involves generally a tractor type vehicle X, a ripper Y, and a ripper mounting attachment Z adapting said ripper Y to the vehicle X. The said vehicle X is preferably a continuous tread type vehicle having a body 10 carrying a power plant 11, driving facilities 12, and a chassis 13 with wheels supported by tracks. The vehicle X is a traction vehicle adapted to pull implements, and the mounting attachment Z and ripper Y are, therefore, located at the rear, as shown.

The ripper Y is adapted to be used in connection with heavy and rugged earth handling equipment, such as a "scarifier," or "grubber," or the like. It is a common expedient, in this type of equipment, to pivotally mount the ripper which involves a lever 14 so that it swings. Said swinging action iseffective in raising and lowering the ripper but ordinarily results in changes of inclination of the tooth point that is provided to penetrate the earth formation.

There is ordinarily a pair of levers 14, one pivotally coupled to the base end of each column 15. There is also a pair of cylinder and piston units 16, each pivotally coupled to the head end of each column 15, and with actuating rods pivotally coupled to the respective levers 14 at points remote from the first mentioned pivot mountings of the levers 14. Thus the levers 14 are raised and lowered by action of the units 16 which remain more or less vertically disposed. As shown, the tool-bar or beam 17 is rigid with the levers 14 and it extends transversely the width of the tractor.

The ripper Y involves generally, an arm-like shank A, a tooth point B carried at the terminal end of the shank A, and retainer means C to secure the point B in working position. In FIG. 1 of the drawings the ripper Y is shown in a retracted position wherein the tooth point B is at the ground level. In FIG. 2 the ripper Y is shown in a lowered position wherein the tooth point B is substantially below the ground level.

The shank A is an arm-like element that is provided to carry a tooth point B and is adapted to be adjustably supported by the mounting attachment Z. The shank A is a straight elongate element having a flat front 21, a flat back 22, and flat sides 23. The front and back and the sides are parallel with each other respectively, the shank A being rectangular in cross-section with the sides 23 substantially closer together than the front and back 21 and 22. The shank A is preferably uniform in cross-section throughout its length with spaced mounting openings 24 intermediate the ends thereof and with a laterally and forwardly projecting adapter 25 at its active lower and terminal end. The adapter 25 comprises upper and lower faces 26 and 27 converging to a vertex, there being an opening transversely through the adapter to receive a retainer means C.

The tooth point B is a removable element adapted to be secured to the adapter 25 above referred to, and involves a point 30 and a housing 31. The point 30 is a flat plate-like part sharpened at its forward end 32 and having a bottom face that has seating engagement with the top 26 of the adapter. The housing 31 is a U-shaped part with side sections spaced to receive the adapter 25 and with a lower wall that converges forwardly where it joins the point 30. Aligned openings are provided in the opposite side sections to receive a retainer means C.

The retainer means C engages through the openings in the adapter and tooth point respectively and it is in the form of a yieldingly expansible elongate pin. When in place or in operating position, the pin extends through both the housing and the adapter 25 that occupies the housing. The pin is a sectional structure involving two like metal sections coupled together by a separating spreader section. The spreader section is resilient and is sequeezed when the pin is in place, to the end that the tooth point B is urged tightly onto the adapter 25, the said openings being initially offset so as to gain this effect.

In carrying out this invention the mounting attachment Z may vary widely in construction and specific details of design. Therefore, the invention is shown rather generally in FIG. 1 of the drawings, as including the tractor X with its characteristic swing lever supported tool-bar, a single ripper Y, and an attachment Z adapted to control said single ripper Y. The attachment Z is in the nature of an apparatus to be installed on the tool-bar 17 at the rear of the tractor X and it involves a clevis D and a control arm E.

The clevis D is provided to pivotally couple the ripper shank A to the tool-bar 17, at a fixed radius from the pivotal axis of the lever 14. As shown, the levers 14 are pivotally coupled to the base end portion of the column 15 by pins 35. In order not to disrupt the continuity and strength of the tool-bar, alteration thereto is avoided, and an ear or ears 36 are added thereto to project forwardly preferably an ear at both the top and bottom planes of the bar 17. The clevis D comprises upper and lower plates 37 and 38 that overlie and underlie the tool-bar 17 to engage with the top and bottom planes thereof. Said plates 37 and 38 extend forwardly to overlie the ears 36, and a pin 39 engages through the plates and ears. At the rear side of the tool-bar 17 the clevis has a wall 40 in flat engagement with the bar, whereby the clevis is prevented from turning or rotating. In order to pivotally couple the ripper Y the clevis D has a pair of laterally spaced and vertically disposed cheeks 41 and 42 projecting from the wall 40. A transversely extending horizontally disposed opening 43 extends through the cheeks 41 and 42 to receive a pin 45. The pin 45 extends through opening 24 in the ripper shank A to pivotally support the same.

The rearmost faces of the cheeks 41 and 42 are notched at 44 in order to receive assisted engagement from the blade of a following tractor X, as is common practice.

From the foregoing it will be seen that the clevis D is effective to form an extension of the lever or levers 14 and to place the axis of the openings 43 and pin 45 at a fixed and determined radius from the axis of pins 35. The two axes of the pins 35 and 45 are spaced and parallel, and horizontally disposed. The axis of pin 35 is provided in the original tractor X, while the axis of pin 45 is established by the clevis D projecting from the rear face of the tool-bar 17.

The cotnrol arm E is provided to maintain the desired vertical alignment of the ripper shank A, or deviation therefrom, as circumstances may require. In the particular case illustrated the ripper shank A is maintained in exact vertical alignment, with the tractor X horizontally disposed. In accordance with the invention the control arm E is cooperatively related to the lever 14 with the attached clevis D and to the shank A of the ripper. As shown, a parallelogram or the like of forces is employed and which involves directly the columns 15, levers 14 and clevises D, the shanks A, and the control arms E.

In accordance with the invention the arm-like shank A is substantially elongated with pairs of openings 24 at relatively widely spaced intervals. In practice, the opening 24 provided to receive pin 45 is positioned about midway of the total length of the shank, while the opening 24 provided to receive the pin 55 of the control arm E is positioned at the upper portion of the shank. Further, aligned transverse openings are provided in the columns 15, in vertical alignment with the pins 35 and spaced the same as the pins 45 and 55, and pins 65 are accommodated therein to pivotally support the arm E. The axes of the pins 35 and 65 are spaced and parallel and extend transversely of the tractor X.

The control arm E extends from the supporting pivot pin 65 to a bifurcated terminal end having openings 54 to receive pins 55. The pins 55 couple the arm E to the upper end of the shank A, the distance between the pins 65 and 55 being the same as between the pins 45 and 35. Therefore, a parallelogram of forces is established whereby the arm E operates parallel with the levers 14. However, it is to be understood that controlled and predetermined angular changes can be gained, for example by shortening the distance between pins 65 and 55 in order to decrease the angle of inclination of tooth point B as it penetrates deeper, and vice versa.

In FIGS. 1 through 4 of the drawings a single ripper Y is shown carried by the tractor X and tool-bar 17. In this case the control arm E has a single bifurcated terminal end adapted to accommodate a single pin 55 for pivoted connection to a single shank A. Since the hydraulic operating cylinders for the tool-bar are directly behind the columns 15, and with the single shank A centrally located, a pair of converging struts 52 are provided and which swing directly between the connecting pins 65 and 55 (see FIG. 3). In this case there is a single clevis D, centrally positioned as shown in FIG. 4.

In FIGS. 5 and 6 of the drawings a double or triple ripper installation is shown, wherein a plurality of rippers Y are carried by the tractor and tool-bar 17. In this case the control arm E' has a plurality of bifurcated terminal ends each adapted to accommodate a pin 55 for pivotal connection to individual shanks A. In this case a pair of divergent struts 62 are provided and which swing directly to a beam 63 that carries the bifurcated terminal ends above referred to. As shown, the beam 63 is rigid with the struts 62, there being braces 64, and there is a bifurcated end for each shank A to be coupled to. In the case illustrated there are three such shanks A and three bifurcated ends, each accommodating a pin 55 to couple with the shanks at the upper openings 24 in the shanks.

From the foregoing it will be seen that the shank A is cooperatively related to the levers 14 and control arm E to become a direct part of the parallelogram of forces. Deflection of the shank A, which necessarily occurs, does not adversely affect movement and operation of the mechanism, and on the contrary the pin connected linkage herein disclosed facilitates deflection and working of all parts involved, so that the tractor X with these associated parts is extremely rugged and durable and not vulnerable in any way.

Having described typical preferred forms and applications of our invention, we do not wish to be limited or restricted to the specific details herein set forth, but wish to reserve to ourselves any modifications or variations that may appear to those skilled in the art and fall within the scope of the following claims.

Having described our invention, we claim:

1. The combination with a tractor having a pair of vertically disposed rigid columns at one end thereof, a pair of levers pivotally connected to said tractor at the lower ends of said columns, a tool-supporting bar of polygonal cross section rigidly joined to the extremities of said levers for pivotal movement between upper and lower positions relative to said tractor, and piston and cylinder means interconnecting the upper ends of said columns and said levers to effect raising and lowering of said levers and said tool-supporting bar, of a ripper attachment comprising:
    (a) a clevis structure having U-shaped end portions at right angles to each other, one end portion defining a horizontal slot to receive said tool-supporting bar, the other end portion defining a vertical slot to receive a ripper bar;
    (b) means for removably securing said clevis structure to said supporting bar;
    (c) a ripper bar vertically disposed in said vertical slot;
    (d) pivot means extending horizontally through said ripper bar and clevis structure, pivotally connecting said ripper bar therein for movement about an axis parallel with the pivotal axis of said levers;
    (e) a link pivotally connected to the upper end of said ripper bar and with at least one of said columns, to form, with the pivotal axis of said pivot means and the pivotal axis of said levers, a parallelogram;
    (f) and a ripper tooth at the lower end of said ripper bar.

2. A ripper attachment as set forth in claim 1, wherein:
    (a) said ripper attachment is mounted at the rear of a tractor;
    (b) and said clevis structure projects rearwardly beyond said ripper bar and is provided with bulldozer, blade-receiving notches for application of auxiliary force in the region of said pivot means.

3. The combination with a tractor having a tool-supporting bar, a lever arm rigidly joined thereto and pivotally connected to the tractor for movement of said tool-supporting bar between upper and lower positions relative to said tractor, and a power cylinder means pivotally connected between said tractor and said tool-supporting bar to raise and lower said tool-supporting bar, of a ripper attachment comprising:
    (a) a clevis structure including a first end portion adapted to receive said tool-supporting bar for rigid attachment thereto, and a second end portion defining a vertical slot to receive a ripper bar;
    (b) a ripper bar vertically disposed in said vertical slot;
    (c) pivot means extending horizontally through said ripper bar and clevis structure, pivotally connecting said ripper bar therein for movement about an axis parallel with the pivotal axis of said lever;
    (d) a link pivotally connected to the upper end of said ripper bar and to said tractor above said lever, to form, with the pivotal axis of said pivot means and the pivotal axis of said lever, a parallelogram;
    (e) and a ripper tooth at the lower end of said ripper bar.

4. A ripper attachment as set forth in claim 3, wherein:
    (a) said ripper attachment is mounted at the rear of a tractor;
    (b) and said clevis structure projects rearwardly beyond said ripper bar and is provided with bulldozer, blade-receiving notches for application of auxiliary force in the region of said pivot means.

References Cited in the file of this patent

UNITED STATES PATENTS

| 2,517,426 | Hall | Aug. 1, 1950 |
| 2,593,679 | Kaupke | Apr. 22, 1952 |
| 2,998,965 | Larson | Sept. 5, 1961 |
| 3,048,229 | Simpson | Aug. 7, 1962 |

FOREIGN PATENTS

| 818,632 | Great Britain | Aug. 19, 1959 |

OTHER REFERENCES

Morgan, I. E.: The Integral Ripper. In Contracting and Construction Equipment. 14(8): pages 52–54. April, 1961 (Sydney, Australia).

Morgan, I. E.: The Integral Ripper on Rubber. In Contracting and Construction Equipment. 15(1): pages 96–101. October, 1961 (Sydney, Australia).